(12) United States Patent
Waite et al.

(10) Patent No.: US 9,102,269 B2
(45) Date of Patent: Aug. 11, 2015

(54) FIELD OF VIEW MATCHING VIDEO DISPLAY SYSTEM

(75) Inventors: Sheldon Waite, Mundelein, IL (US); Marcin Klimecki, Northbrook, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 360 days.

(21) Appl. No.: 13/205,799

(22) Filed: Aug. 9, 2011

(65) Prior Publication Data

US 2013/0038732 A1 Feb. 14, 2013

(51) Int. Cl.
*H04N 7/18* (2006.01)
*B60R 1/00* (2006.01)

(52) U.S. Cl.
CPC ............. *B60R 1/00* (2013.01); *B60R 2300/202* (2013.01); *B60R 2300/605* (2013.01); *B60R 2300/8026* (2013.01)

(58) Field of Classification Search
CPC .......................... B60R 1/00; B60R 2300/8026
USPC ......................................... 345/7, 1.2; 348/148
See application file for complete search history.

(56) References Cited

U.S. PATENT DOCUMENTS

| | | | |
|---|---|---|---|
| 6,163,336 A | 12/2000 | Richards | |
| 6,634,749 B1 | 10/2003 | Morrison et al. | |
| 7,379,559 B2 | 5/2008 | Wallace et al. | |
| 2003/0151563 A1* | 8/2003 | Kulas | 345/7 |
| 2006/0232672 A1 | 10/2006 | Sim et al. | |
| 2010/0199228 A1 | 8/2010 | Latta et al. | |
| 2010/0219985 A1* | 9/2010 | Schofield et al. | 340/932.2 |
| 2010/0289899 A1 | 11/2010 | Hendron et al. | |
| 2012/0154591 A1* | 6/2012 | Baur et al. | 348/148 |
| 2013/0030811 A1* | 1/2013 | Olleon et al. | 704/267 |

FOREIGN PATENT DOCUMENTS

| | | |
|---|---|---|
| EP | 1974998 A1 | 10/2008 |
| JP | 2004 330873 A * | 11/2004 |
| JP | 2004330873 A * | 11/2004 |
| WO | 2006/027563 A1 | 3/2006 |

OTHER PUBLICATIONS

International Search Report and Written Opinion dated Nov. 23, 2012, from corresponding International Patent Application No. PCT/US2012/047200.

* cited by examiner

*Primary Examiner* — Tung Vo
*Assistant Examiner* — Rowina Cattungal

(57) ABSTRACT

A field of view matching video display system may comprise a tracking device, a rear-facing camera, a processing device, and a display. The tracking device is configured to capture a first video image in a predefined area in the vehicle and provide a first video image signal. The rear-facing camera is configured to capture a second video image and provide a second video image signal. The processing device is configured to analyze the first video image obtained via the first video image signal to determine a head position of the driver, determine a first field of view for the driver based on the head position of the driver, generate a third video image that substantially corresponds with at least a portion of the first field of view of the driver, and provide a third video image signal. The display is configured to show the third video image.

15 Claims, 4 Drawing Sheets

FIELD OF VIEW MATCHING VIDEO DISPLAY SYSTEM

TECHNICAL FIELD

The invention relates generally to systems and methods for a video to be obtained and displayed for matching a driver's field of view.

BACKGROUND

A driver's rear view in a vehicle may be partially or completely obstructed in various situations. For example, a vehicle may be equipped with a multimedia entertainment system which includes a viewing screen mounted on the ceiling of the vehicle. When the viewing screen is in a position that is viewable by the rear occupants of the vehicle, it may partially or completely block the driver's view as reflected in the rearview mirror. For another example, vehicles such as, but not limited to, cargo trucks, moving trucks, recreational vehicles ("RVs"), and tractor trailer truck typically lack a rear window or the rear window is obstructed and, therefore, the driver's view out the rear of the vehicle is obstructed.

To restore the driver's rear view which is partially or completely blocked, a display may be used to display an image obtained from a rear-facing camera. This display may be integrated into the rearview mirror. Alternatively, the display may be placed behind the driver with the functional viewing side of the display facing the front of the vehicle. The driver may then view the display from a reflection in the rearview mirror or turn around and view the display directly. However, a problem associated with using the display to restore an obstructed view is the perspective of the image displayed may not match the driver's current viewing angle and, therefore, the driver's perspective of the image. Additionally, as the driver's viewing angle changes, such as when the driver moves his head position, the image on the display may not accordingly adjust the image to match the current viewing angle. As a result, the images shown on the display may not mimic what the driver would actually see if the driver's view were not obstructed.

Therefore, it may be desirable to have a display for restoring a driver's obstructed view which substantially matches the driver's current viewing angle with the video image that is currently on the display.

SUMMARY

In an embodiment, a field of view matching video display system for a vehicle having a driver may comprise a tracking device, a rear-facing camera, a processing device, and a display. The tracking device may be configured to capture a first video image in a predefined area in the vehicle, such as where the driver would be located, and provide data of the first video image in a first video image signal. The rear-facing camera may be configured to capture a second video image, such as an area in a rearward direction, and provide data of the second video image in a second video image signal. The processing device is configured to receive the first video image signal and second video image signal. The processing device may analyze the first video image obtained from the first video image signal to determine a head position of the driver. The processing device may then determine a first field of view for the driver based on the head position of the driver. The processing device may obtain a third video image that substantially corresponds with at least a portion of the first field of view of the driver and provide a third video image signal. The display may be configured to display the third video image obtained from the third video image signal.

In an embodiment, a method of matching a field of view of a display system for a vehicle to a driver's field of view may comprise capturing a first video image of a predefined area in the vehicle with a tracking device, determining whether the driver is present in the vehicle with a processing device that analyzes the first video image, determining a head position of the driver based on the first video image with the processing device, determining a first field of view of the driver based on the head position of the driver with the processing device, capturing a second video image with a rear-facing camera, generating a third video image based on a portion of the second video image, wherein the portion of the second video image substantially corresponds with the first field of view of the driver, and displaying the third video image on a display of the display system.

In an embodiment, a method of matching a field of view of a display system for a vehicle to a driver's field of view may comprise capturing a first video image of a predefined area in the vehicle with a tracking device, determining whether the driver is present in the vehicle with a processing device that analyzes the first video image, determining a head position of the driver based on the first video image with the processing device, determining a first field of view for the driver based on the head position of the driver with the processing device, positioning a rear-facing camera such that a second field of view of the rear-facing camera substantially corresponds with the first field of view of the driver, capturing a second video image with the rear-facing camera, generating a third video image based on the second video image, and displaying the third video image on a display of the display system.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
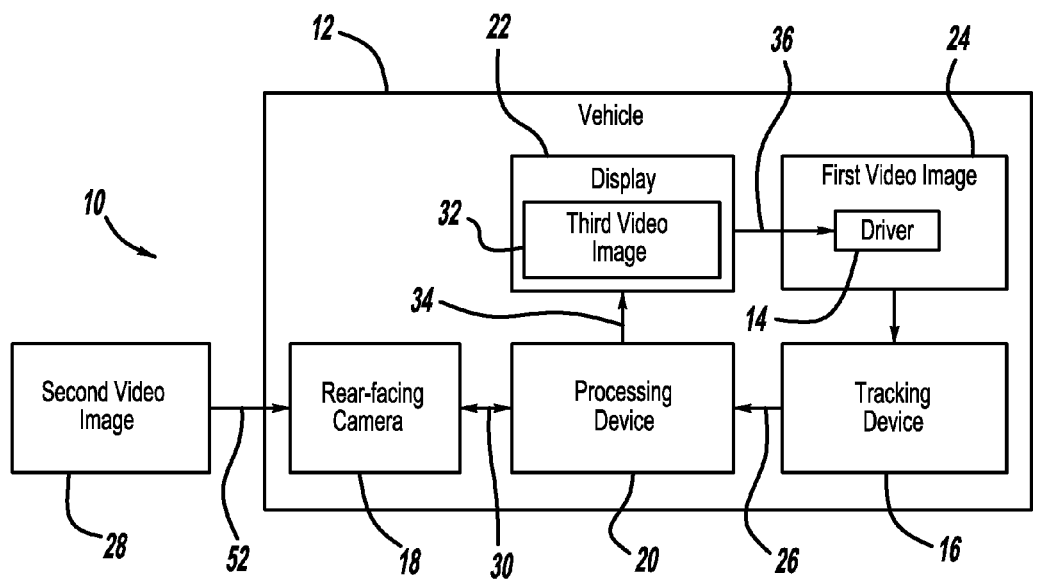
FIG. 1 is a block diagram of an exemplary field of view matching video display system in a vehicle having a driver.

FIG. 1. represents a block diagram of an embodiment of a field of view matching video display system 10 in a vehicle 12 having a driver 14. The field of view matching video display system 10 may comprise a tracking device 16, a rear-facing camera 18, a processing device 20, and a display 22. The tracking device 16 may capture a first video image 24 and send a first video image signal 26. The rear-facing camera 18 may capture a second video image 28 and send a second video image signal 30. The processing device 20 may obtain a third video image 32 and send a third video image signal 34. The display 22 may display the third video image 32 which may be observed by the driver 14 from a first field of view 36 of the driver 14.

Figure 2:
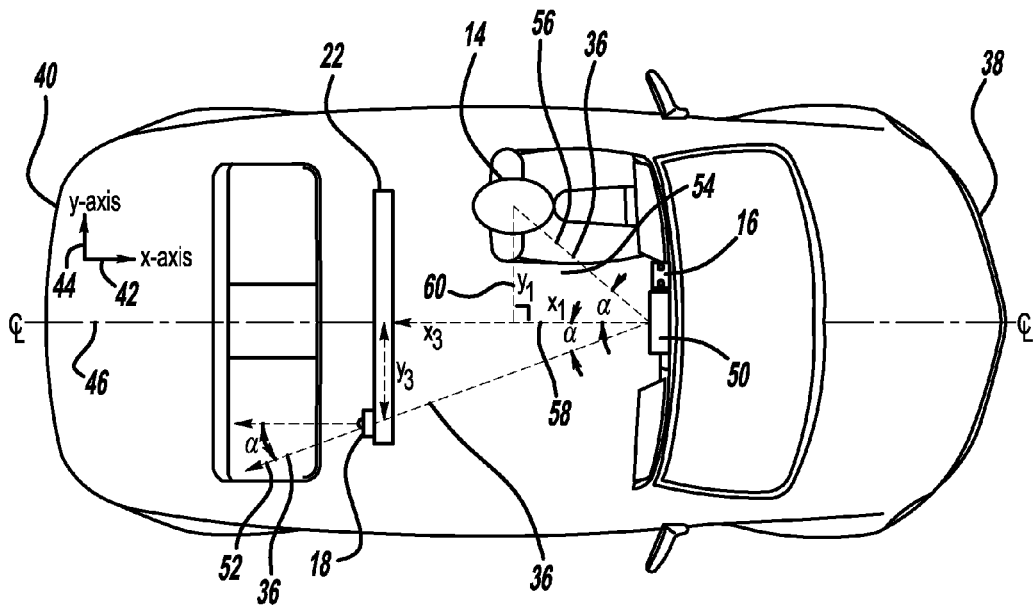
FIG. 2. is a top schematic view of a the vehicle having a driver and utilizing the field of view matching video display system of FIG. 1.
Figure 3:
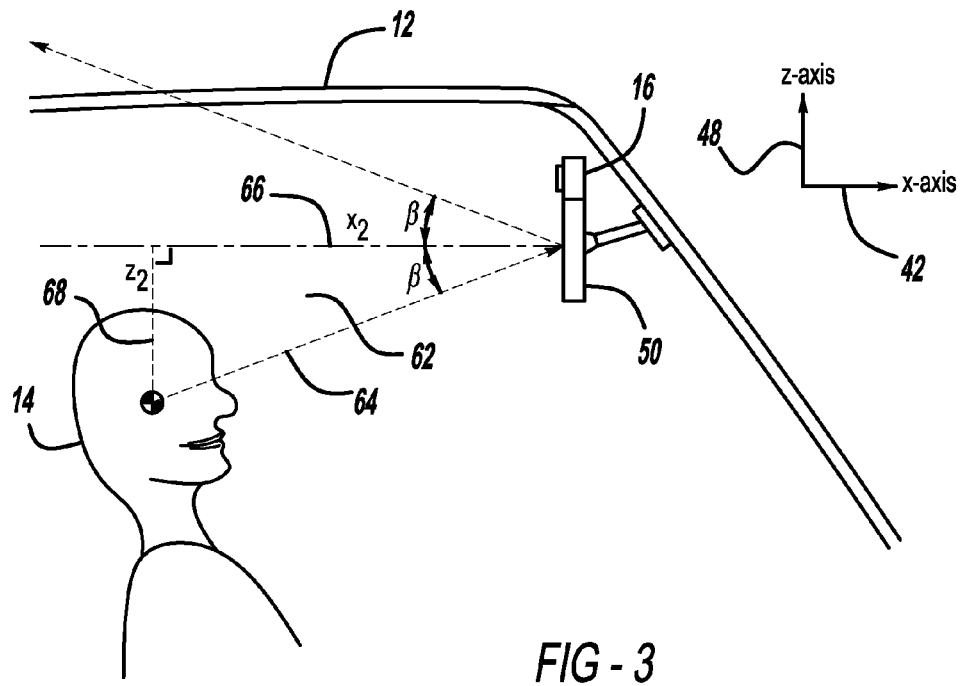
FIG. 3. is a side schematic view of a portion of the vehicle of FIG. 2.
Figure 4:
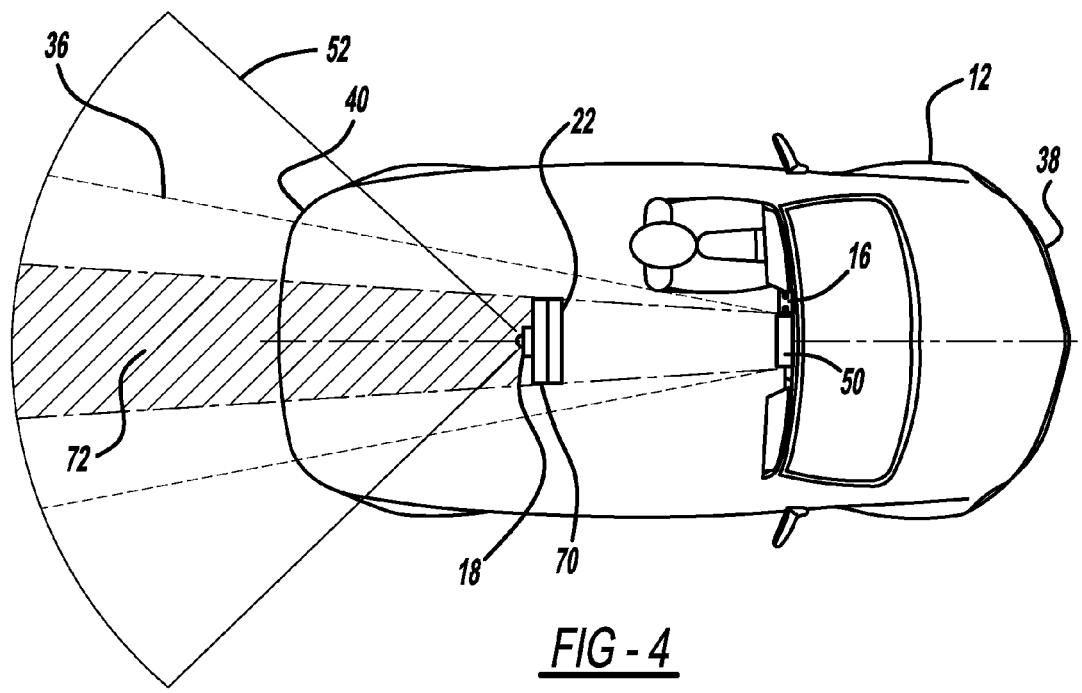
FIG. 4. is a top schematic view of a vehicle having a driver and utilizing the field of view matching video display system of FIG. 1 in accordance with a first embodiment of the invention.
Figure 5:
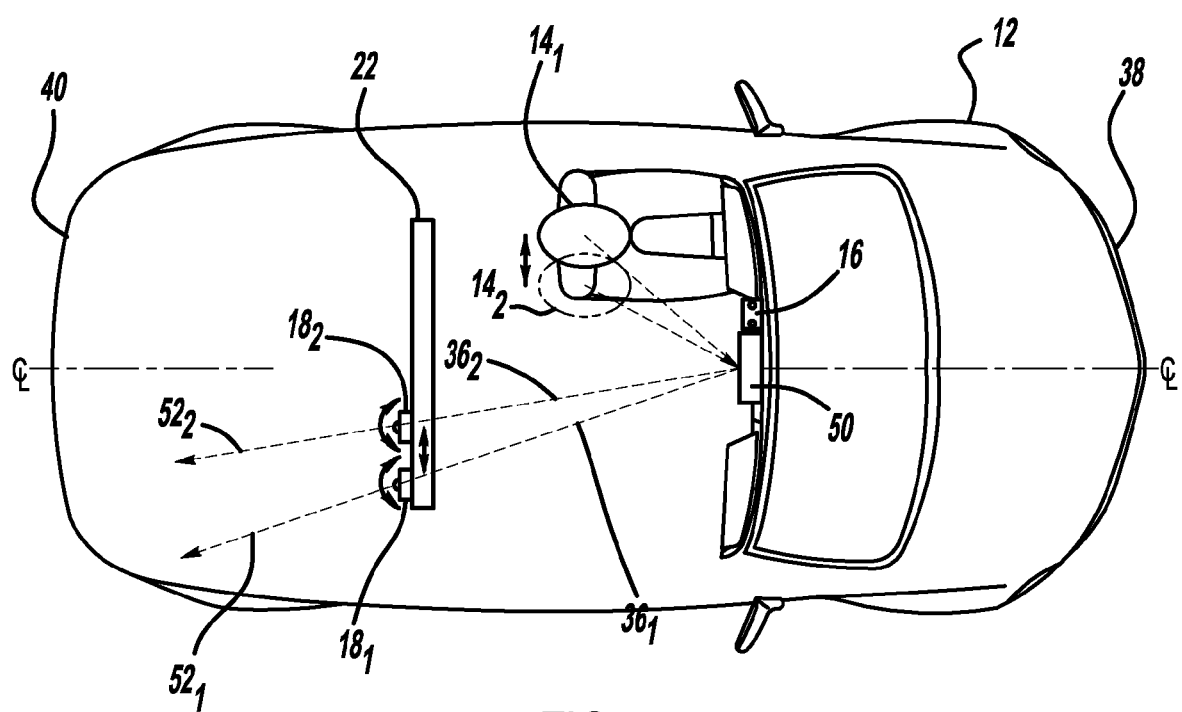
FIG. 5. is a top schematic view of a vehicle having a driver and utilizing the field of view matching video display system of FIG. 1 in accordance with a second embodiment of the invention.

Referring to FIGS. 2, 4 and 5, the vehicle 12 is shown in outline from a top view. The vehicle 12 has a front end 38 and a rear end 40. The vehicle may have a x-axis 42 and a y-axis 44. The x-axis 42 is parallel to the centerline 46 of the vehicle that runs from the front end 38 of the vehicle to the rear end 40 of the vehicle 12. The y-axis 44 is parallel to an axle of the vehicle 12 and is also perpendicular to the x-axis 42. Referring to FIG. 3, the vehicle 12 is shown from a side view. The vehicle 12 may also have a z-axis 48. The z-axis 48 is perpendicular to both the x-axis 42 and the y-axis 44.

Referring to FIGS. 1-5, the tracking device 16 is an apparatus configured to capture the first video image 24 in a predefined area in the vehicle 12 and provide the first video image signal 26 which may be encoded with data of the first video image 24. The predefined area may be the area where the driver 14 sits while driving. The predefined area may be large enough where the first video image 24 may include the head of the driver 14 and additional area around the head of the driver 14 to account for movement of the head of the driver 14. The first video image 24 may be a video image, a stereoscopic image, a three dimensional (3-D) image, an infrared image, and/or any type of image which may be used to determine the location of objects captured in the image as known to those of skill in the art.

The tracking device 16 may be located anywhere in the interior of the vehicle 12 where it may obtain the first video image 24 in the predefined area in the vehicle 12. In an embodiment, the tracking device 16 may be located proximate to a rearview mirror 50. In an embodiment, the tracking device 16 may be integrated with the rearview mirror 50. For example, the tracking device 16 may be positioned in the housing of the rearview mirror 50.

The tracking device 16 may comprise an imaging component (not shown), including but not limited to, a video camera, a plurality of video cameras, an RGB camera, a 3-D camera, an infrared light device, a depth camera, a time-of-flight imaging sensor, and/or other image capturing devices that may be configured to capture the location of objects in images as known to those with skill in the art. The imaging component may capture the first video image 24 digitally. After the tracking device 16 has captured the first video image 24, the tracking device 16 may be configured to provide the first video image signal 26 encoded with data of the first video image 24 to the processing device 20.

For example, in an embodiment where the tracking device 16 comprises a video camera, the video camera may be configured to obtain a two-dimensional (2-D) digital image. The 2-D image may be used to determine the object location in two dimensions, such as if the driver 14 were to shift laterally or up and down. The third dimension, such as depth, may also be obtained from the image or may be estimated. The data from the 2-D image may be used to calculate the depth of objects by rendering the 2-D image into a 3-D image using depth mapping techniques as known to those with skill in the art. Alternatively, data from a seat position sensor (not shown) may be used to obtain an estimated depth of the head position of the driver 14 relative to the tracking device 16.

In another example of an embodiment of the invention, the tracking device 16 may comprise a plurality of video cameras. When two or more physically separated video cameras view a scene from different angles, the data from the two images may be compared to obtain 3-D location data of the position of the head and/or eyes of the driver 14 using stereoscopic image techniques as known to those with skill in the art.

In another example of an embodiment of the invention, the tracking device 16 may comprise an infrared light device and an image capturing device, such as, but not limited to a RGB camera, 3-D camera, depth camera, and/or time-of-flight imaging sensor. The infrared light device may emit infrared light and the image capturing device may detect the backscattered light from surfaces, such as the head and/or eyes of the driver 14. The data obtained from the image capturing device may be used to determine the position of the head and/or eyes of the driver 14 by using time-of flight analysis techniques as known to those of skill in the art. This embodiment may be useful when a light source in the predefined area is scarce because this embodiment produces its own light source in the form of infrared light. This embodiment may also be used in combination with the other embodiments described above.

The rear-facing camera 18 is an apparatus configured to capture the second video image 28 in a generally rearward direction. Data of the second video image 28 may be embedded in a second video image signal 30 and sent to the processing device 20 (described in more detail below). The second video image 28 or a portion of the second video image 28 may be used to replace a portion of the view of the driver 14 that is obstructed. For example, the driver's view may be obstructed by a display screen of a rear-facing entertainment system 70 mounted on the ceiling of the vehicle 12 or the vehicle 12 may lack a rear window. The rear-facing camera 18 may obtain the second video image 28 through a lens component (not shown). The lens component may be a fixed lens or a zoom lens. The lens component may also be a wide angle lens.

The rear-facing camera 18 may be located rearward of the obstruction 70 such that the second field of view 52 of the rear-facing camera 18 may capture an image an obstructed view 72, which may be the portion of the first field of view of the driver 14 that is obstructed. For example, the rear-facing camera 18 may be located proximate to the display screen of the rear entertainment system 70. The rear-facing camera 18 may also be located on the rear end 40 of the vehicle 12, on the ceiling of the vehicle 12, on the interior paneling of the vehicle 12, or any location in the interior or on the exterior of the vehicle 12 as known to those with skill in the art where rear-facing camera 18 may capture an image of the obstructed view 72 of the driver 14.

In a first embodiment, the rear-facing camera 18 may be fixed in a specific direction and immovable, such as in a position that aligns the optical axis of the lens component directly rearward and parallel to the x-axis. The rear-facing camera 18 may have a wide angle lens component and may obtain the second video image 28 through a second field of view 52. The second field of view 52 of the rear-facing camera may be wider than the first field of view 36 of the driver 14.

The second field of view 52 of the rear-facing camera may also substantially overlap the first field of view 36 of the driver 14. The second video image 28 may be cropped to display only a portion of the second video image 28. The cropped second video image 28 may also be stretched to adjust the perspective of the cropped second video image 28. The cropping and stretching of the second video image 28 may be determined by the processing device 20 based on criteria configured to match the second video image 28 to an unobstructed field of view of the driver 14.

In a second embodiment, the rear-facing camera 18 may be configured to be movable, and the second field of view 52 of the rear-facing camera 18 may change direction and angle relative to the vehicle 12. The second field of view 52 of the rear-facing camera 18 may be modified by changing the direction of the rear-facing camera 18 relative to the vehicle 12. For example, the rear-facing camera 18 may be configured for translational motion, where the rear-facing camera 18 may laterally move on an axis parallel to y-axis. Additionally, the rear-facing camera 18 may be configured for rotational motion, where the rear-facing camera 18 may pivot to change the angle of the second field of view 52 of the rear-facing camera 18. As the rear-facing camera 18 changes direction and/or angle, the second field of view 52 of the rear-facing camera 18 changes respectively which results in a different perspective for the second video image 28. The motion of the rear-facing camera 18 may be controlled by the processing device 20 based on criteria configured to match the perspective of the second video image 28 to an unobstructed field of view of the driver 14.

When the rear-facing camera 18 is configured to be movable, the rear-facing camera 18 may also be comprised of a motion component to provide the necessary translational motion and/or rotational motion. For example, the motion component may comprise electric motors, servos, and other motion enabling devices as known to those of skill in the art. For translational motion, the rear-facing camera 18 may be mounted in a slot, and the rear-facing camera 18 may be propelled laterally by the motion component. For rotational motion, the rear-facing camera 18 may be configured to pivot and/or rotate to the desired angle by the motion component.

The processing device 20 is an apparatus configured to analyze the first video image 24 obtained from the first video image signal 26 to determine a head position of the driver 14.

The processing device 20 may analyze the first video image 24 to determine the head position of the driver 14 using image analysis techniques for determining the location of objects in the image, such as, but not limited to, comparison techniques, color segmentation techniques, contrast comparison techniques, depth mapping techniques, stereoscopic techniques, time of flight analysis, and other image analysis techniques known to those with skill in the art. For example, the processing device 20 may extract edges of objects found in the first video image 24 to form an extraction shape. The extraction shape may then be compared to a predefined criteria to determined if the extraction shape is the head of a driver 14. If the head of a driver 14 is determined to be in the first video image 24, then the position of the head in two dimensions may be calculated based on the location of the extracted shape in the first video image 24. The third dimension, or depth of the object in the first video image 24 may also be determined. The technique used to determine the depth of the object in the first video image 24 may depend on the apparatus used to capture the first video image 24 as described in the various embodiments of the tracking device 16.

For example, in an embodiment, the first video image 24 may be obtained from a stereoscopic camera where the first video image 24 may comprise a first image field and a second image field. The first image field and second image field may be interlaced to form the first video image 24. The head of the driver 14 may be extracted using any of the above image extraction techniques, such as, but not limited to comparison techniques, color segmentation techniques, and contrast comparison techniques. When the head of the driver 14 is found in the image, two dimensions for the position of the head may be calculated by determining the position of the extracted shape relative to its location in the first video image 24. The third dimension (depth) for the position of the head may be determined from the stereoscopic image by comparing the difference between the first image field and the second image field because each image field was captured at a different viewing angle. The difference in position between the image fields may be correlated to a depth position which may allow the head position of the driver 14 to be characterized in three dimensions.

In another embodiment, the first video image 24 may be obtained from an infrared light device and infrared image capturing device. Using time-of-flight analysis, the particles of light that scatter off the surface of the head of the driver 14 may be used to generate 3-D data of the surface of the head of the driver 14. This 3-D data may be used to determine the head position of the driver 14.

After determining the head position of the driver 14, the processing device 20 may determine a first field of view 36 of the driver 14 based on the head position of the driver 14. Referring to FIG. 2, the driver 14, an optical axis of the first field of view 36 of the driver 14, a rearview mirror 50, and the display 22 are shown in the vehicle 12 in a top schematic view. For illustrative purposes, the rearview mirror 50 is shown with the reflective surface of the mirror parallel to the plane formed by the y-axis and z-axis. The rearview mirror 50 may be rotated so that the optical axis of the first field of view 36 of the driver 14 after reflecting off the rearview mirror 50 may be directed rearward substantially parallel to the x-axis. The orientation of the rearview mirror 50 may be detected by sensors (not shown) and sent to the processing device 20.

The orientation of the head of the driver 14 and the rear view mirror may be used to define a first right angle triangle 54 having a first hypotenuse leg 56, a first adjacent leg 58 having a length of $X_1$, and a first opposite leg 60 having a length of $Y_1$ in the x-y plane as seen in FIG. 2. The first hypotenuse leg 56 is formed between the head of the driver 14 and the rearview mirror 50. The first adjacent leg 58 is formed from a line that is perpendicular to the planar surface of the rearview mirror 50 with a length of $X_1$ between the rearview mirror 50 and the first opposite leg 60. The first opposite leg 60 is formed between the head of the driver 14 and the first adjacent leg 58 and is perpendicular to the first adjacent leg 58. The optical axis of the first field of view 36 of the driver 14 may be at an angle α from which the driver 14 sees the rearview mirror 50, or in other words, the angle between the first hypotenuse leg 56 and the first adjacent leg 58 of the first right angle triangle 54. The processing device 20 may determine the angle α by taking the tangent of the length of the first opposite leg 60 over the length of the first adjacent leg 58 ($α=\tan(Y_1/X_1)$). By determining angle α, the processing device 20 may determine direction of the optical axis of the first field of view 36 of the driver 14 in two dimensions.

Referring to FIG. 3, the driver 14, an optical axis of the first field of view 36 of the driver 14, the rearview mirror 50, and the display 22 are shown in the vehicle 12 in a side schematic view. For illustrative purposes, the rearview mirror 50 is shown with the reflective surface of the mirror parallel to the plane formed by the y-axis and z-axis. The orientation of the head of the driver 14 and the rearview mirror 50 may be used to define a second right angle triangle 62 having a second hypotenuse leg 64, a second adjacent leg 66 having a length of $X_2$, and a second opposite leg 68 having a length of $Z_2$ in the x-z plane as seen in FIG. 3. The second hypotenuse leg 64 of the second right angle triangle 62 is formed between the head of the driver 14 and the rearview mirror 50. The second adjacent leg 66 is formed from a line that is perpendicular to the planar surface of the rearview mirror 50 with a length of $X_2$ between the rearview mirror 50 and the second opposite leg 68. The second opposite leg 68 is formed between the head of the driver 14 and the second adjacent leg 66 and is perpendicular to the second adjacent leg 66. The optical axis of the first field of view 36 of the driver 14 may be at an angle β from which the driver 14 sees the rearview mirror 50, or in other words, the angle between the second hypotenuse leg 64 and the second adjacent leg 68 of the second right angle triangle 62. The processing device 20 may determine the angle β by taking the tangent of the length of the second opposite leg 68 over the length of the second adjacent leg 66 ($\beta=\tan(Z_2/X_2)$). By determining angle α and angle β, the processing device 20 may determine direction of the optical axis of the first field of view 36 of the driver 14 in three dimensions.

After determining the first field of view 36 of the driver 14, the processing device 20 may obtain the third video image 32 that substantially corresponds with at least a portion of the first field of view 36 of the driver 14. The third video image 32 data may then be outputted as a third video image signal 34 that may be encoded with data of the third vide image 32. In a first embodiment where the rear-facing camera 18 may be immovable, the processing device 20 may obtain the third video image 32 by manipulating the second video image 28 captured by the rear-facing camera 18 by cropping and/or stretching portions of the cropped second video image 28. The processing device 20 may determine how much of the second video image 28 may need to be cropped based on the first field of view 36 of the driver 14 and the position and size of the display 22 and/or any other obstruction.

For example, referring to FIG. 4, the rear-facing entertainment system 70 may cause the obstructed view 72 that obscures a portion of the first field of view 36 of the driver 14. The display 22 of the system 10 may be configured to be disposed back-to-back to a display of the rear-facing entertainment system 70. The display 22 of the system 10 may thus be located behind the driver 14 and the rearward view for the driver 14 may be seen in a reflection of the rearview mirror 50 in an embodiment of the invention. The first field of view 36 of the driver 14 may be constrained by the size of the rearview mirror 50, where the rearview mirror 50 is large enough to maximize a reflected rearward view through a rear window of the vehicle 12. The fixed size and position of the rear-facing entertainment system (or other obstruction) 70, as well as the fixed size and position of the display 22 of the system 10 (if it further obscures an additional portion of the first field of view of the driver 14) may be programmed in the processing device 20. The processing device 20 may then use the data of the fixed size and position of the rear-facing entertainment system (or other obstruction) 70 and of the display 22 of the system 10 to determine where to crop the second video image 28. Additionally, when the center axis of the obstructed view 72 is aligned with the optical axis of the first field of view 36 of the driver 14 as seen in FIG. 4, perspective manipulation, such as stretching of the cropped section of the second video image 28, may not be required. However, when the first field of view 36 of the driver 14 shifts, the center axis of the obstructed view may no longer be aligned with the optical axis of the first field of view 36 of the driver 14. As a result, the perspective of the obstructed view 72 will become skewed. The processing device 20 may determine the angular difference between the center axis of the obstructed view 72 and the optical axis of the first field of view 36 of the driver 14 and proportionally stretch a portion of the cropped section of the second video image 28 to obtain the required perspective. The third video image 32 is generated from the cropped and/or stretched second video image 28 and may be sent to the display 22 by the third video image signal 34.

Referring to FIGS. 2 and 5, in a second embodiment where the rear-facing camera 18 may be configured to be movable, the processing device 20 may obtain the third video image 32 by positioning the rear-facing camera 18 such that the optical axis of the rear facing camera is substantially aligned with the optical axis of the first field of view 36 of the driver 14. The fixed size and position of the rear-facing entertainment system (or other obstruction) 70 and of the display 22 of the system 10 may be programmed in the processing device 20. The processing device 20 may then use the data of the fixed size and position of the obstruction 70 and of the display 22 to determine how far to move the rear-facing camera 18 laterally and how much to rotate the rear-facing camera 18. As seen in FIG. 2, when the first field of view 36 of the driver 14 is at the angle α, the same angle α may be used to rotate the rear-facing camera 18. Using the distance ($X_3$) between the display 22 and the rearview mirror 50, the amount of lateral movement may be calculated by multiplying the distance ($X_3$) by the tangent of angle α ($Y_3=X_3*\tan(\alpha)$). The processing device 20 may send a signal to the motion component of the rear-facing camera 18 to move the rear-facing camera 18 to the determined position. As seen in FIG. 5, when the head position of the driver 14 moves (driver 14$_1$ having a first head position and driver 14$_2$ having a second head position), the angle α may change. Accordingly, the first field of view 36$_1$ for driver 14$_1$ is different than the first field of view 36$_2$ for driver 14$_2$. As a result, the processing device 20 may reposition the rear-facing camera 18 to account for the change in the first field of view 36 of the driver 14. In particular, the rear-facing camera 18$_1$ may be in a first position to have a second field of view 52$_1$ when driver 14$_1$ has a first field of view 36$_k$. The rear-facing camera 18$_2$ may be in a second position to have a second field of view 52$_2$ when driver 14$_2$ has a first field of view 36$_2$.

Additionally, in the second embodiment where the rear-facing camera is configured to be movable, the third video image 32 may be obtained directly from the second video image 28 without the need to crop and/or stretch the second video image 28 under certain circumstances. For example, if the optical axis of the second field of view 52 of the rear-facing camera can be substantially aligned to the optical axis of the first field of view 36 of the driver 14, then the second video image 28 may have the correct perspective and the lens component may zoom to the required image size. However, if the rear-facing camera 18 is mounted such that the optical axis of the second field of view 52 of the rear-facing camera 18 cannot substantially align with the optical axis of the first field of view 36 of the driver 14, the perspective of the second video image 28 may be slightly distorted. To correct the slight distortion in the perspective and/or size of the second video image 28, the lens component of the rear-facing camera 18 may be configured to obtain a wider second field of view 52 of the rear-facing camera 18 and the processing device 20 may crop and/or stretch the second video image 28 to obtain the correct perspective in the third video image 32. The third video image 32 may then be sent to the display 22 via the third video image signal 34.

The processing device 20 may comprise any type of processor or multiple processors, a microprocessor known as a single integrated circuit, a plurality of integrated circuits, and/or any suitable number of integrated circuits working in cooperation to accomplish the functions of the processing device 20 as described hereinabove. Circuitry for accomplishing the functions of the processing device 20 as described hereinabove in a control algorithm can be readily provided by those having ordinary skill in the art after becoming familiar with the teachings herein. The processing device 20 may receive data of the first video image 24, run a set of instructions to determine the head position of the driver 14 and a first field of view 36 of the driver 14, identify a desirable second field of view 52 of the rear-facing camera 18, receive data of the second video image 28, and run a set of instructions to select and/or manipulate the second video image 28 to generate a third video image 32 corresponding to the first field of view 36 of the driver 14.

The display 22 is an apparatus configured to display the third video image 32 obtained from the third video image signal 34 sent by the processing device 20. The third video image 32 shown on the display 22 has a field of view that mimics the first field of view 36 of the driver 14 which has been obstructed. The display 22 may be mounted behind the driver 14 and may be viewed by the driver 14 through the rearview mirror 50. The display 22 may be mounted on the obstruction 70. For example, in an embodiment where the vehicle 12 is equipped with a ceiling mounted rear-facing entertainment system 70, the display of the rear-facing entertainment system 70 may cause the obstructed view 72. The display 22 of the system 10 and the display of the rear-facing entertainment system 70 may be mounted back to back where the functional side of the display 22 of the system 10 is directed in a forward direction and may be viewable by the driver 14 through the rearview mirror 50. In another embodiment, the obstructed view 72 may be caused by an obstruction 70 such as a rear end, a wall, or another portion of the vehicle (e.g. a rear end that lacks a rear window in the vehicle 12) such as, but not limited to, obstructions that exist in cargo trucks, semi-trucks, and other similarly configured vehicles 12 as known to those with skill in the art. The display 22 may be mounted on the wall causing the obstruction, thereby mimicking a rear window. The display 22 may be viewed from the rearview mirror 50 or by the driver 14 physically turning such that the first field of view 36 of the driver 14 may directly view the display 22. As a potentially lower cost solution, the display 22 may also be integrated with the rearview mirror 50. The display 22 may be configured to be visible only when actively showing the third video image 32. This may be accomplished using a polarized mirror in front of the display 22 or other techniques as known to those with skill in the art. For example, when the item causing the obstruction is removed, such as folding the display of the rear-facing entertainment system 70 back into the ceiling and out of the first field of view 36 of the driver 14, the display 22 may be deactivated by powering off or by not displaying the third video image 32. When the display 22 is integrated with the rearview mirror 50, the display 22 may be hidden behind the reflection of the mirror and may be non-visible to the driver 14. The display 22 may be a LCD display or other similar displays that may be packaged in a small area as known to those with skill in the art. The display 22 may be configured such that the border surrounding the screen is minimized so that the display 22 mimics the obstructed view 72 as close as possible to the first field of view 36 of the driver 14 if no obstruction 70 were there.

Figure 6:
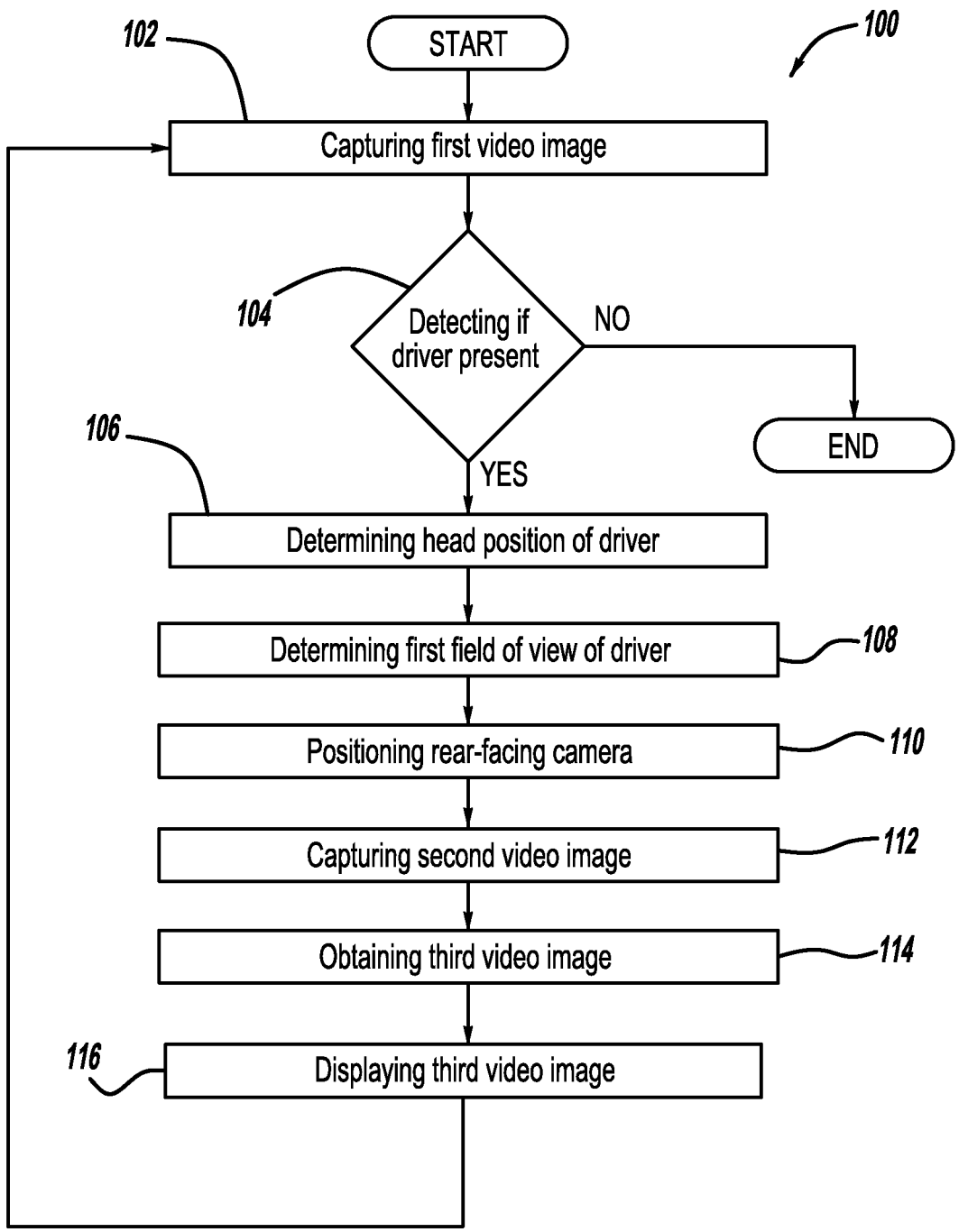
FIG. 6 is a flowchart generally illustrating the steps of a method for matching a driver's field of view to a field of view on a video display in accordance with an embodiment of the invention as illustrated in FIG. 1.

FIG. 6 generally illustrates an embodiment of a method 100 of matching a field of view 52 of a display system 22 for a vehicle 12 to a field of view of a driver 14. The method may be performed using a field of view matching video display system 10 that comprises a tracking device 16, a rear-facing camera 18, a processing device 20, and a display 22.

The method may begin at step 102 when the tracking device 16 captures a first video image 24 of a predefined area in the vehicle 12. The tracking device 16 may send the first video image 24 to the processing device 20 via a first video image signal 26.

In step 104, the processing device 20 may detect whether a driver 14 is present. If the driver 14 is not present, then the method 100 may be complete. If the driver 14 is present, then in step 106, the processing device 20 may determine the head position of the driver 14. Additionally, the processing device 20 may determine the eye position of the driver 14 in step 106 in an embodiment of the invention.

In step 108, the processing device 20 may determine the first field of view 36 of the driver 14 based on the head position and/or eye positions of the driver 14 already determined by the processing device 20 in step 106. In accordance with an embodiment of the invention, the processing device 20 may identify a desirable second field of view 52 of the rear-facing camera 18 and may output position data for the rear-facing camera 18 based on the desirable second field of view 52.

In step 110, the processing device 20 may send the position data to a motion component of the rear-facing camera 18. The position data received by the motion component of the rear-facing camera 18 may allow the rear-facing camera 18 to move to a position that substantially matches the second field of view 52 of the rear-facing camera 18 with the first field of view 36 of the driver 14. This may be accomplished by aligning the optical axis of the second field of view 52 of the rear-facing camera 18 to the optical axis of the first field of view 36 of the driver 14 as close as physically possible based on where the rear-facing camera 18 is mounted. For embodiments where the rear-facing camera 18 is immovable, this step may be skipped.

In step 112, the rear-facing camera 18 may capture a second video image 28. The rear-facing camera 18 may send the second video image 28 to the processing device 20 via a second video image signal 30.

In step 114, the processing device 20 obtains a third video image 32 based on the second video image 28. In some embodiments where the rear-facing camera 18 is movable, the third video image 32 may be substantially identical to the second video image 28. In other embodiments (even if the rear-facing camera 18 is movable), the processing device 20 may crop and/or stretch the second video image 28 such that the size and the perspective of the third video image 32 substantially matches the driver's 18 field of view that would otherwise be completely and/or partially obstructed. The processing device 20 may send the third video image 32 to the display 22 via a third video image signal 34.

In step 116, the display 22 may display the third video image 32 obtained from the third video image signal 34. In an embodiment, the display 22 may determine whether or not to display the third video image 32 based on whether an obstruction of the first field of view 36 of the driver 14 exists. The method 100 may be repeated starting back at step 102 until power for the system 10 is lost, such as when the vehicle 12 is powered down.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A field of view matching video display system for a vehicle having a driver, the system comprising:
    a tracking device comprising a plurality of cameras directed toward the driver's head at a corresponding plurality of different angles, each camera providing image data that represents images of the driver's head from the different angles;
    a movable rear-facing camera, having a field of view which changes responsive to lateral movement of the rear-facing camera along an axis that is substantially parallel to an axle of the vehicle, wherein the rear-facing camera is configured to translate along said axis laterally responsive to a determined angle of the driver's head, the rear-facing camera being additionally configured to capture a second video image obtained from said rear-facing camera's field of view at different lateral positions along said axis and provide a second video image signal representing the rear-facing camera's field of view at different lateral positions;
    a processing device, wherein the processing device is configured to:
        analyze image data obtained from the first plurality of cameras and determine therefrom a head position of the driver in three dimensions;
        determine a first field of view for the driver based on the head position of the driver, the first field of view for the driver being smaller than the rear-facing camera's field of view;
        determine an obstructed portion of the driver's first field of view, the obstructed portion being caused by a field of view obstruction that is located between the rear-facing camera and the driver;
        obtain from the second video image, a third video image for presentation on a forward-facing display device located behind the driver and in front of the field of view obstruction, the third video image being obtained by selectively cropping the second video image responsive to the processing device determining a portion of the second video image needed to fill the obstructed portion of the first field of view with an image of the first field of view without the field of view obstruction; and
    a forward-facing display device, configured to show the third video image.

2. The system according to claim 1, wherein the processing device is further configured to expand a cropped second video image responsive to a head position and eye positions of the driver.

3. The system according to claim 1, further comprising a rearview mirror, wherein the forward-facing display device is located behind the driver, and configured to be viewable from a reflection in the rearview mirror.

4. The system according to claim 3, wherein the forward-facing display device has a front side and a back side and is configured to be positioned on a display of a rear-facing display for an entertainment system, the rear-facing display having a second front side and a second back side, such that the first back side of the forward-facing display device is facing the second back side of the rear-facing display of the entertainment system.

5. The system according to claim 4, wherein the forward-facing display device completely covers the second back side of the rear-facing display of the entertainment system from the driver when viewing a reflection in the rearview mirror.

6. The system according to claim 4, wherein the rear-facing camera is located proximate to the rear-facing display of the entertainment system.

7. The system according to claim 1, wherein the vehicle has a front and an opposing rear and wherein the rear-facing camera is located proximate to the rear of the vehicle.

8. The system according to claim 1, further comprising a rearview mirror, wherein the forward-facing display device is located in a direction forward of the driver and is configured to be integrated with the rearview mirror.

9. The system according to claim 1, wherein the rear-facing camera is configured to capture the second video image by both translational and rotational positioning of the rear-facing camera, and wherein the processing device is configured to determine the translational and rotational positioning of the rear-facing camera.

10. The system according to claim 1, wherein the rear-facing camera has a corresponding field of view wider than the field of view of the driver.

11. The system according to claim 1, wherein the rear-facing camera has a corresponding first field of view, wherein the first field of view of the driver is completely within the first field of view of the rear-facing camera.

12. The system according to claim 1, wherein at least one camera of the tracking device cameras is integrated with a rearview mirror.

13. The system according to claim 1, wherein the display is configured to also display a textual message.

14. The system according to claim 13, wherein the textual message is displayed by scrolling across the screen.

15. A field of view matching video display method for a vehicle having a driver, the method comprising:
    directing a plurality of cameras toward the driver's head at a corresponding plurality of different angles, each camera providing image data that represents images of the driver's head from the different angles; using a movable rear-facing camera, having a field of view which changes responsive to lateral movement of the rear-facing camera along an axis that is substantially parallel to an axle of the vehicle, wherein the rear-facing camera is configured to translate along said axis laterally responsive to a determined angle of the driver's head, to: capture a second video image obtained from said rear-facing camera's field of view at different lateral positions along said axis and provide a second video image signal representing the rear-facing camera's field of view at different lateral positions; analyzing image data obtained from the first plurality of cameras and determining therefrom a head position of the driver in three dimensions; determining a first field of view for the driver based on the head position of the driver, the first field of view for the driver being smaller than the rear-facing camera's field of view;

determining an obstructed portion of the driver's first field of view, the obstructed portion being caused by a field of view obstruction that is located between the rear-facing camera and the driver; obtaining from the second video image, a third video image for presentation on a forward-facing display device located behind the driver and in front of the field of view obstruction, the third video image being obtained by selectively cropping the second video image responsive to determining a portion of the second video image needed to fill the obstructed portion of the first field of view with an image of the first field of view without the field of view obstruction; and showing the third video image on a forward-facing display device.

* * * * *